July 14, 1953  S. B. THOMAS ET AL  2,645,567
CATALYTIC REACTOR TUBE ASSEMBLY
Filed May 24, 1952  2 Sheets-Sheet 1
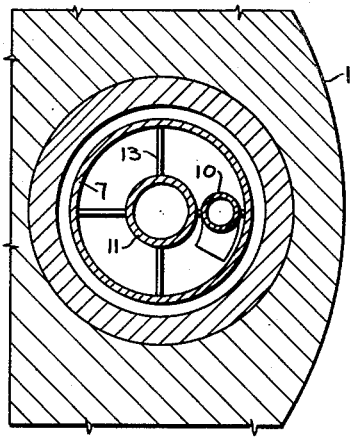
Fig. II
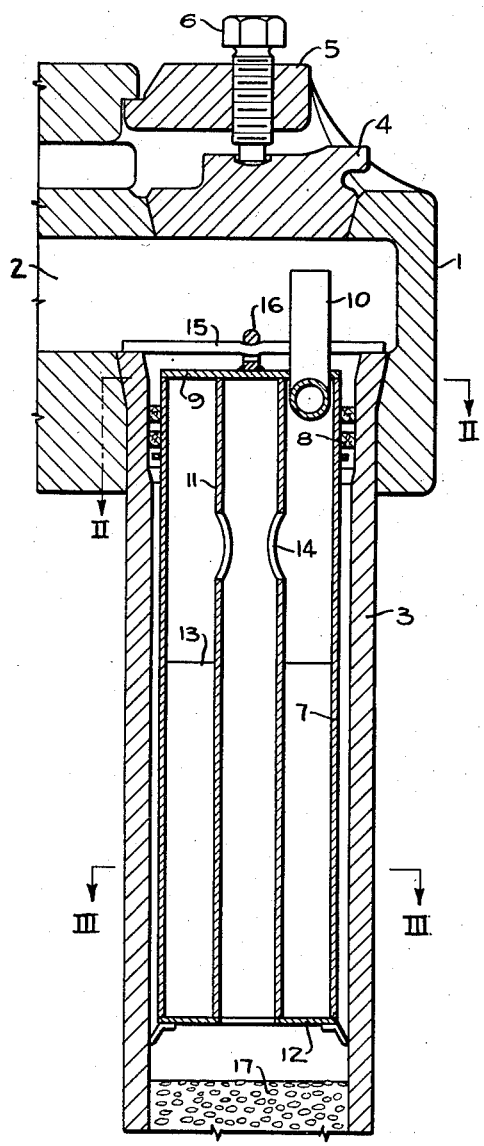
Fig. I
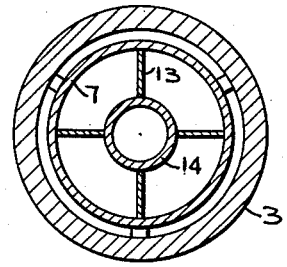
Fig. III
INVENTORS:
SAMUEL B. THOMAS
HARRY D. EVANS
BY:
THEIR ATTORNEY July 14, 1953  S. B. THOMAS ET AL  2,645,567
CATALYTIC REACTOR TUBE ASSEMBLY
Filed May 24, 1952  2 Sheets-Sheet 2
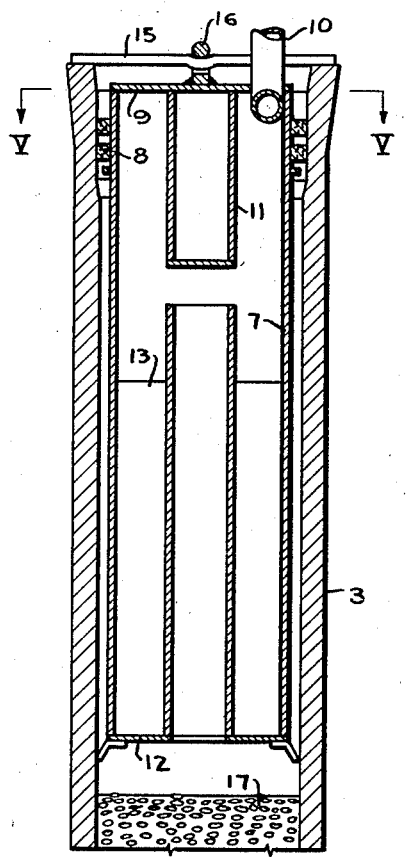
Fig. IV
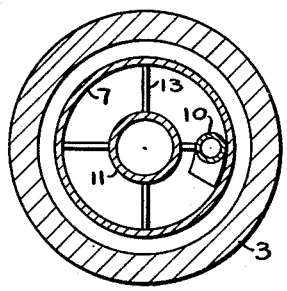
Fig. V
INVENTORS:
SAMUEL B. THOMAS
HARRY D. EVANS
BY:
THEIR ATTORNEY Patented July 14, 1953

2,645,567

UNITED STATES PATENT OFFICE 2,645,567

CATALYTIC REACTOR TUBE ASSEMBLY

Samuel B. Thomas, Long Beach, and Harry D. Evans, Concord, Calif., assignors to Shell Development Company, Emeryville, Calif., a corporation of Delaware Application May 24, 1952, Serial No. 289,714

4 Claims. (Cl. 23—288)

This invention relates to a new and improved catalytic reactor tube assembly. A particular aspect of the invention relates to an anti-plugging device adapted for use in catalytic reaction tubes.

It is common practice to carry out various chemical reactions or treatments by passing the material to be reacted or treated in the vapor phase in contact with a solid contact agent under suitable conditions of temperature, pressure, time, etc. In many such processes it is the practice to provide the solid contact agent in the form of a fixed bed of granules or other pieces and to pass the vapors of the feed material through the bed in an essentially continuous manner. Most such treatments are either exothermic or endothermic in nature, i. e., heat is released or absorbed by the reaction or other transformation which is taking place. On the other hand, it is generally very important to retain and control the temperature rather closely in order to obtain an efficient and fast treatment of the feed material while avoiding serious difficulties. Since, however, most of the solid contact agents are poor heat conductors in the form of a foraminous bed, the transfer of sufficient heat to maintain good temperature conditions is a most difficult problem. One approach towards the solution of this difficult problem is to arrange the contact material such that every point within the bed of the solid is only a short distance from a suitable heating or cooling surface, e. g., a metal wall, and the most practical and common application of this approach is to place the contact material in long narrow tubes which may be heated or cooled as the process requires. While this arrangement is the most practical from the engineering standpoint, it leaves much to be desired from the processing standpoint. One of the chief drawbacks in the use of such reaction tubes is the large amount of work required to force the vapors through the long thin bed of foraminous solid contact material. This disadvantage is particularly pronounced where large amounts of diluent material are applied with the vapors being treated. For example, in the catalytic dehydrogenation of butylene to butadiene it is common practice to pass about 12 volumes of steam through the catalyst bed with each volume of butylene feed; in the desulfurization and reforming of gasolines, naphthas and other hydrocarbon oils it is the practice to recycle a large excess of hydrogen through the catalyst bed, e. g., seven thousand cubic feet per barrel.

During operation the pressure required to pass the vapors through the reaction tubes gradually increases until it finally becomes necessary to dump the tube and recharge it with fresh contact material. A further difficulty lies in the fact that a single reaction tube of practical length is capable of holding only a relatively small amount of contact material; consequently, it is the practice to employ a considerable number of such tubes in parallel arrangement. In operation the increase in pressure drop is rarely uniform in the various tubes and consequently the flow through the various tubes becomes uneven; the heat release or uptake, therefore, varies among the individual tubes, and the tube or tubes that are overheated consequently plug.

It has generally been supposed that the mentioned difficulties were due to gradual settling and disintegration of the particles or pieces of the solid contact material, and this may, in fact, be one contributing cause. It is, nevertheless, found that the usual increase in pressure drop is caused to a large extent in many cases by a comparatively small accumulation of powder on the top of the inlet end of the bed of contact material and that this increase in the pressure drop due to this latter cause can be effectively eliminated by passing the feed vapors entering each reaction tube through a miniature centrifugal separator-collector within the reaction tube.

A centrifugal separator-collector which is particularly adapted for use in such reaction tubes having internal diameters from about 2 inches up to about 8 inches and which has particular advantages for use in such tubes is illustrated in Figures I, II and III of the accompanying drawing. Figures IV and V illustrate a variation in the design which is otherwise similar to that illustrated in Figures I, II and III.

Figure I shows in section part of a feed inlet header, reaction tube, and internal centrifugal separator-collector. Figure II is a horizontal section of the centrifugal separator-collector taken through the plane II—II. Figure III is a horizontal section taken through the plane III—III. The apparatus illustrated comprises the internal centrifugal collector-separator applied in a common type of tubular reactor such as used in the catalytic reforming and resulfurization of hydrocarbon oils. The present invention is particularly advantageous in this process because: 1. The reaction is highly endothermic and consequently long narrow tubes are used. 2. The process is particularly sensitive to temperature differences; the reaction falls off rapidly if the temperature drops for any reason and there is great danger of plugging the tube with carbonaceous deposits if localized zones of higher temperature are allowed to develop. 3. The feed materials normally contain sulfur compounds that corrode the apparatus producing finely divided metal sulfides which tend to collect on the top of the catalyst bed and greatly increase the pressure drop. 4. The process is carried out under a high pressure with large amounts of recycled hydrogen and any increase pressure drop is, therefore, particularly costly.

In the reforming process the hydrocarbon oil to be treated is mixed with a large excess of recycled gas consisting largely of hydrogen. The mixture is vaporized and preheated in a suitable preheating furnace to approximately the desired reaction temperature, e. g., 800–950° F. under a substantial pressure of the order of 10 to 70 atmospheres and the hot vaporous mixture is then passed into a header from which it is passed downwardly through a number of parallel reaction tubes which may, for example, be 30 feet long and 4½ inches internal diameter. The reaction tubes are filled in the greater part of their length with pellets of a suitable reforming catalyst, e. g., ⅛ inch pellets of a catalyst consisting of 0.3% platinum, supported upon hydrofluoric acid treated alumina. The hydrogen to hydrocarbon mole ratio is, for example, 5 to 1; the hydrocarbon liquid hourly space velocity is, for example, 2. The vaporous reaction products are collected in a bottom header and passed to a condenser and separator to separate the liquid product from the hydrogen, hydrogen sulfide and other difficultly condensable gases. In order to supply the large amount of heat necessary to retain the reaction temperature, hot combustion gases are passed around the reaction tubes.

Referring to Figures I, II and II of the drawing part of a top feed header 1 is shown in section. The vaporous reaction mixture is supplied through the space 2. The upper part of the reaction tube is designated by the reference number 3. The reaction tube is securely fastened to the header, e. g., by rolling. An opening with plug 4 is provided in the header directly above the reaction tube. The plug is held in place by the bolt block 5 and pressure bolt 6.

The centrifugal collector-separator comprises a cylinder 7 of such size that it may be inserted through the opening and into the reaction tube. The cylinder is provided on the outside near the top with suitable packing means 8 to provide an essentially vapor-tight seal with the inner wall of the reaction tube. The top of the cylinder is sealed by the cover plate 9. Sealed to the underside of the cover plate 9 and centrally depending therefrom is a second cylinder 11 which divides the space within the first cylinder into a central cylindrical space and an annular space between the two cylinders. The cross section of the annular space is larger than that of the inner cylinder. The annular space between the cylinders is sealed off at the bottom by the annular ring plate 12. An inlet pipe 10 passes through the top cover at essentially right angles and as close to the periphery of the plate as practical. The pipe is bent approximately 90° on the underside of the plate so that it substantially parallels the plate and is nearly in contact therewith. It may also be curved somewhat in the horizontal plane to more or less parallel the wall of the cylinder. The cross section of the inlet pipe is chosen to handle the required volume of gas. The diameter of the inner cylinder is then preferably chosen such that the width of the annular space is only slightly larger than the width of the inlet pipe. The inlet line therefore preferably occupies substantially the total width of the annular space. The annular space between the two cylinders is, furthermore, baffled or partitioned in the lower part by substantially vertical partitions 13. The inner cylinder 11 is provided with holes, slots, or other outlet ports 14 above the top of the partitions 13. These ports should be located below the top of the inner cylinder and below the bottom of the inlet pipe 10. The whole assembly is suspended in the reaction tube by any suitable fastening, such as, for example, the cross bar 15 passing through the eye 16 on the upper side of the cover plate.

The assembly, it will be noted, is designed to be easily slipped into the top of the reaction tube above the catalyst bed 17, while, at the same time, forming a substantially vapor-tight seal so that the reactant vapors are forced to pass through the inlet pipe 10. The inlet pipe 10 is arranged to discharge the incoming reactant vapors into the annular space as near the top as practical and as near the edge as is practical so as to cause the vapors to swirl in the annular space around the inner cylinder. The swirling and downwardly moving gas is withdrawn downwardly through the inner cylinder and to the reaction tube. Dust particles are thrown to the outer wall by the centrifugal force and fall into the bottom part of the annular space between the partitions which space provides storage for the separated solids. The partitions 13 are for the purpose of stopping and preventing the swirling of the gas in the lower part of the apparatus and are not raised to a height which is sufficiently high to cause disturbing eddy currents in the region of the mentioned ports. The storage space provided is substantial and sufficient to store all of the solids which are collected over an extended period of operation, e. g., equivalent to the normal life of the catalyst. The collected solid material is removed from the separator-collector when the catalyst is changed. However, the separator-collector may be easily removed and cleaned at any other time such for instance as during any unscheduled shut down.

In a typical case the reaction tube is 4½ inches internal diameter. The outer cylinder 7 is 4 inches external diameter and 19 inches long. The inlet pipe 10 is ⅜ inch in diameter and L-shaped. The distance between the top of the vertical leg and the center of the horizontal leg is 3 inches and the distance between the end of the horizontal leg and the center of the vertical leg is 1¼ inches. The central cylinder 11 is 1¼ inches internal diameter. The ports 14 are two 1¼ inch holes on opposite sides of the cylinder 11 and are centered about 5 inches below the top plate 9. The partitions 13 extend from the bottom up to within about 3 inches of the center of the ports.

The arrangement just described is efficient and easily constructed of light materials. A variation of this structure which is equally efficient, but somewhat more difficult to fabricate, is illustrated in Figures IV and V of the drawing. The only difference is in the arrangement of the ports in the inner cylinder. Referring to Figures IV and V, it is seen that instead of extending the inner cylinder to the top closure and providing the necessary ports in its side, the inner cylinder is cut off at the desired height of the port and the upper depending end is sealed, thus providing an upper sealed dummy cylinder. This and other permissible variations in the details of the inlet pipe, the suspension, etc., which will be apparent to those skilled in the fabrication of related objects are considered to be within the scope of the invention.

We claim as our invention:

1. A centrifugal separator-collector adapted for insertion in catalytic reaction tubes which comprises in combination, two concentric cylinders providing an annular space between them, a top closure sealing the ends of said cylinders, a bottom closure sealing the bottom of said annular space while leaving the bottom of the inner cylinder open, and an inlet conduit entering said annular space at the top thereof and extending substantially parallel to said top closure and to the walls of said cylinders, the said annular space being in direct communication with the space within the inner cylinder only through ports in the latter located intermediate the ends thereof.

2. A centrifugal separator-collector according to claim 1 further characterized in that the annular space below said ports is of substantial volume and is provided with vertical baffles arranged to prevent swirling of gas in the lower part of said annular space.

3. A centrifugal separator-collector adapted for insertion in catalytic reaction tubes which comprises in combination an outer cylinder of suitable diameter with top and bottom closures, a dummy cylinder of lesser diameter axially located within said outer cylinder and depending from the said top closure, an inlet conduit passing through said top closure into the annular space between said two cylinders and extending therein substantially parallel to the said closure and the walls of said cylinders, an axial cylinder open at both ends extending through said bottom closure up into said outer cylinder to a point short of the bottom of said dummy cylinder, and partition means between said outer cylinder and said open ended cylindrical conduit.

4. A centrifugal separator-collector adapted to be mounted within a reaction tube and which comprises in combination an outer cylinder of suitable diameter provided with a top closure, a second cylinder of lesser diameter within said outer cylinder and sealed centrally to said top closure in dependent position, an annular bottom closure between said two cylinders which seals the annular space between the two cylinders while leaving the bottom of the inner cylinder open, an inlet conduit passing through said top closure into said annular space between said two cylinders and bent immediately below said top closure in a direction parallel to said top closure and substantially parallel to the wall of said outer cylinder, vertical partitions within the annular space between said cylinders in the bottom part thereof, said annular space between said cylinders and the space within the said inner cylinder being substantially sealed from each other except for open ports in the said inner cylinder located below the said inlet conduit and above the tops of said partitions.

SAMUEL B. THOMAS.
HARRY D. EVANS.

References Cited in the file of this patent

UNITED STATES PATENTS

| Number | Name | Date |
|---|---|---|
| 2,187,741 | Houdry | Jan. 23, 1940 |
| 2,432,757 | Weniger | Dec. 16, 1947 |